United States Patent [19]

Green et al.

[11] 4,353,804
[45] Oct. 12, 1982

[54] IMPROVED FLUID LOSS CONTROL SYSTEM

[75] Inventors: Peter C. Green, Ellicott City; Jacob Block, Rockville, both of Md.

[73] Assignee: W. R. Grace & Co., New York, N.Y.

[21] Appl. No.: 239,071

[22] Filed: Feb. 27, 1981

Related U.S. Application Data

[63] Continuation-in-part of Ser. No. 169,886, Jul. 17, 1980, abandoned, which is a continuation-in-part of Ser. No. 144,365, Apr. 28, 1980, abandoned.

[51] Int. Cl.$^3$ ................................................ C09K 7/02
[52] U.S. Cl. ............................ 252/8.5 A; 252/8.5 C; 252/8.5 P
[58] Field of Search ............ 252/8.55 R, 8.5 A, 8.5 B, 252/8.5 C; 325/61; 260/42.51, 42.29

[56] References Cited

U.S. PATENT DOCUMENTS

| | | | |
|---|---|---|---|
| 2,879,268 | 3/1959 | Jullander | 536/87 X |
| 3,081,260 | 3/1963 | Park | 252/8.5 |
| 3,265,536 | 8/1966 | Miller et al. | 260/42.29 X |
| 3,272,749 | 9/1966 | Martin | 252/8.5 |
| 3,872,018 | 3/1975 | Alexander | 252/316 X |
| 3,909,421 | 9/1975 | Gaddis | 252/8.55 |

FOREIGN PATENT DOCUMENTS 356408  9/1931  United Kingdom ................. 525/61

*Primary Examiner*—Herbert B. Guynn
*Attorney, Agent, or Firm*—Howard J. Troffkin

[57] ABSTRACT

The invention is directed to a composition capable of imparting improved fluid loss control properties to aqueous systems. The composition is formed from a combination of:
(a) a solid, particulate silicate or alumino-silicate material;
(b) a reaction production formed from a polyvinyl alcohol and at least 1 percent of stoichiometry of an aldehyde containing or generating agent; wherein the amount of component (a) to component (b) is in the ratio of at least about 0.75:1.

Further, the invention is directed to improved drilling fluids containing said composition and to the process of drilling bore holes using said improved drilling fluid.

15 Claims, No Drawings

IMPROVED FLUID LOSS CONTROL SYSTEM

This is a copending continuation-in-part application of U.S. Ser. No. 169,886 filed July 17, 1980 which, in turn, is a continuation-in-part of U.S. Ser. No. 144,365 filed Apr. 28, 1980, both now abandoned.

BACKGROUND OF THE INVENTION

The present invention relates to a composition which is capable of imparting improved fluid loss controlling properties to aqueous systems. More particularly, the present invention relates to the formation of an improved water-based drilling fluid containing the subject composition and to an improved method of drilling bore holes into subterranean formations using said drilling fluid.

In normal well drilling operations in which a well is drilled by a rotary method, the well bore hole is generally filled with a drilling fluid or mud which is circulated therein. Drilling fluids are usually pumped down through the drill stem of the rotary rig, circulated around the drill bit and returned to the surface through the annular passage between the drill stem and well wall. These drilling fluids perform a number of functions including lubricating the drill stem and bit, cooling the bit, carrying the cuttings from the bit up the bore hole to the surface where the cuttings may be separated and disposed of, and providing a hydrostatic head against the walls of the well to contain downhole geopressure.

Various clay or colloidal clay bodies such as bentonite, sepiolite, attapulgite and the like have been used in drilling fluids for many years. The use of these materials has caused the industry to refer to drilling fluids as "muds."

The drilling fluid must be capable of resisting the loss of fluid, normally water, into the porous strata through which the bore hole traverses. The loss of fluid causes the formation and build-up of a cake deposit which, after a period of time, can result in the sticking of the drill pipe and stoppage of the drilling operation. The fluid must, therefore, be of a nature which permits minimum loss into the porous strata. Agents which impart such property are conventionally termed "water loss controllers" or "fluid loss controllers."

The drilling fluid must be capable of exhibiting the above-described fluid-loss properties under changing composition and environmental conditions encountered during the drilling operation. The drilling fluid components should be substantially stable to the presence of various calcium compounds as well as sodium chloride which may be present in the fluid from the soil strata with which it is in contact and/or due to the use of salt water having calcium or sodium salts therein used in forming the drilling fluid.

It is also desired that the agents contained in conventional drilling fluids are stable and functional at elevated temperature. It is well known that as the bore hole increases in depth the temperatures encountered are substantially above that found at the earth's surface. Further, heat is generated by frictional forces on the drill bit. It is, therefore, desired that components used in forming drilling fluids be stable and functional at varying elevated temperature conditions.

The increased filtrate viscosity caused by the viscosifying agent of a drilling fluid has been relied upon as a mode of aiding in fluid loss control with little success especially when drilling into and through microporous formations. To further enhance the control, various agents have been added. For example, in U.S. Pat. No. 3,032,498 a cyanoethylated starch was described as a water loss controller when used in combination with a clay-based mud. U.S. Pat. No. 3,988,246 describes an esterified or etherified starch as a water loss controlling agent when combined with a xanthan gum based drilling mud. Other starches have been employed in clay free muds under limiting temperature conditions as starches are known to be temperature sensitive.

Bentonite clays which have sodium as the major exchangeable ion, such as Wyoming bentonite, have been used to impart fluid loss controlling properties to drilling fluids. These bentonites must be used in large dosages to approach practical fluid loss properties and usually impart fluid loss which is still higher than desired by the industry. Bentonite clays which have calcium or magnesium as the major exchangeable ion have been used to impart rheological properties to drilling muds, but these clays are not capable of imparting fluid loss properties.

There is a need for a method for imparting a high degree of fluid loss inhibiting properties to solid particulate silicate or alumino-silicate materials contained in aqueous compositions such as drilling fluid compositions. The properties of the composition should be stable to varying conditions and temperatures commonly encountered in drilling operations.

SUMMARY OF THE INVENTION

The present invention is directed to a composition capable of imparting improved fluid loss control properties to alkaline aqueous systems. The composition is a combination of:

(a) a solid, particulate silicate or alumino-silicate material; and (b) a reaction product formed in an acidic medium between a polyvinyl alcohol with at least about 1 percent of stoichiometry of an aldehyde containing or generating agent.

The subject combination imparts improved fluid loss controlling properties unattributable to each of the components and which are stable to elevated temperature and conditions commonly encountered in bore hole drilling operations.

DETAILED DESCRIPTION OF THE INVENTION

The present invention is directed to a composition which is capable of imparting a high degree of fluid loss controlling properties to aqueous systems; to the use of such compositions to form an improved water-based, drilling fluid; and to drilling of bore holes into subterranean formations using said improved drilling fluid.

The subject composition is a combination of a silicate or alumino-silicate clay and a polyvinyl alcohol/aldehyde reaction product. The subject composition shall be described in terms of its use as a component of a drilling fluid.

It has been presently found that silicate or alumino-silicate solid, particulate material can be used to impart a high degree of fluid loss properties to aqueous systems when combined with the polyvinyl alcohol reaction product described herein. It is preferred that the solid, particulate material be substantially inorganic and contain a major amount of kaolinite, halloysite, montmorillonite or illite minerals or mixtures thereof and the like.

The preferred materials are attapulgite, sepiolite, bentonite and kaolin.

Bentonite clays are readily available from various sources throughout the world. The material is conventionally mined either from open pits or underground deposits. It is dried from its natural moisture content of 30 to 40 percent to a moisture content of from about 5 to 15 percent. The dried material is customarily pulverized, usually by a roller mill, to a fineness of 200 mesh (90%) or smaller. Bentonite can contain various exchangeable cations within its structure. The major cation can be sodium, potassium, calcium, magnesium or ammonium.

Attapulgite clays are widely used in the drilling industry to impart viscosity to drilling fluids having high electrolyte content. Attapulgite clays are extensively mined in the Georgia–Florida area of the United States. These clays do not exhibit fluid loss control properties.

Other silicate or alumino-silicate materials can be used as the solid, particulate component. These materials can be formed from a variety of natural or artificial sources. They may be in the form of mineral bearing materials of kaolinite, halloysite, montmorillonite or illite or mixtures thereof.

The solid, particulate material found useful in the subject composition should be particulate material such that at least about 90 percent by weight is capable of passing through a No. 20 U.S. Standard Sieve. It is preferred that the major portion of the material be smaller than No. 20 and larger than No. 325 mesh U.S. Standard Sieve Size. The term "solid" as used in the subject application and claims defines a material which is substantially insoluble in the fluid medium. Material of the same or similar composition can also be present which are of smaller and/or larger particle size.

The polyvinyl alcohol reaction product found useful in forming the subject inventive composition is formed by contacting polyvinyl alcohol and an aldehyde containing or generating compound. The polyvinyl alcohols found useful in forming the subject reaction product have a weight average molecular weight of at least about 20,000 and preferably the weight average molecular weight should be from about 90,000 to 200,000. Conventionally, polyvinyl alcohol is the hydrolyzed product of polyvinyl acetate. The hydrolysis should be at least about 75 percent complete and preferably at least about 80 to 95 percent complete to form a suitable polyvinyl alcohol reactant. The polyvinyl alcohol reactant, such as formed from the hydrolysis of polyvinyl acetate or the like, can be reacted in an aqueous medium with an aldehyde containing or generating reactant. Suitable aldehyde containing reactants are organic chemical compounds which contain at least one aldehyde group therein as are well known and include, for example, formaldehyde, acetaldehyde, propionaldehyde, glycolaldehyde, glyoxalic acid and the like or polyaldehydes i.e. organic compounds having more than one aldehyde group in the compound, such as glyoxal, paraformaldehyde and the like. Other suitable aldehyde reactants include aldehyde generating agents i.e. known organic compounds capable of forming an aldehyde group in situ, such as melamine-formaldehyde monomeric products and derivatives such as tri and hexa(methylol) melamine and the tri and hexa($C_1$–$C_3$ alkoxymethyl) melamine. Such materials can be formed by known conventional methods. The alkyl blocked derivatives are commercially available, are stable to self polymerization and are, therefore, preferred. Of all of the aldehyde reactants, the preferred reactants are paraformaldehyde and formaldehyde.

The subject polyvinyl alcohol reaction product found suitable in the subject composition to impart the desired properties can be formed by reacting a polyvinyl alcohol, as described above, with from at least about 1 and preferably from about 1 to 200 and most preferably from about 2 to 50 percent of stoichiometry of an aldehyde reactant based on the hydroxyl content of the polyvinyl alcohol. We define stoichiometry as the reaction of 2 OH groups with one aldehyde group. Excess aldehyde can be used. The particular amount of aldehyde agent will depend on its solubility in the aqueous reaction media, and its reactivity as is known and determinable by conventional means.

The reaction is carried out in an aqueous medium which should be acidic, that is, have a pH of about 5.5 or less and preferably from about 2 to 4.5. The reaction can be carried out at ambient or elevated temperatures, such as from about 50° C. to 100° C. The solid product can be recovered by conventional techniques such as by salting out with a sulfate, carbonate or phosphate salt, decantation, filtration and drying.

Compositions of the combination of the above described solid, particulate component and the polyvinyl alcohol/aldehyde reaction product have unexpectedly been found to impart a high degree of water-loss control which is unattainable by separate use of the materials.

The various solid, particulate materials including argillaceous materials, such as magnesium or calcium bentonite, impart substantially no fluid loss inhibiting properties to aqueous systems. Even sodium bentonite is known to be capable of imparting only fair properties in high dosages.

The presently described polyvinyl alcohol/aldehyde reaction products do not, when used alone, exhibit and impart fluid-loss control to aqueous systems such as water-based drilling fluids.

It has been presently unexpectedly found that when the polyvinyl alcohol/aldehyde reaction product is combined with the above described solid, particulate silicate or alumino-silicate materials, one unexpectedly attains an exceptionally high degree of fluid-loss control not attributable to either component.

The aqueous system which contains the subject composition should have an alkaline pH of at least 8 and preferably from 8 to 12.0 and more preferably of from 8.3 to 11.8. At these alkaline pH conditions, one attains the desired properties. Adjustment of the pH can be done with any water soluble inorganic base or acid such as alkali metal hydroxide, alkaline earth metal hydroxide or a hydrohalic acid, sulfuric acid, nitric acid, sodium bicarbonate, or sodium carbonate.

The polyvinyl alcohol/aldehyde reaction product can be used in any effective amount which, when combined with the herein described silicate or alumino-silicate materials, imparts a high degree of water-loss control to the resultant aqueous system. Normally suitable amounts are from about 0.3 to 5 percent and preferably from about 0.75 to 2 percent polyvinyl alcohol/aldehyde reaction product based on the weight of the water of the resultant aqueous system. The concentration most suitable can be readily determined in conventional manners taking into consideration the nature of the polymer i.e. molecular weight, hydroxyl content, aldehyde reactant, etc., as well as the nature and concentration of other materials contained in the aqueous system.

The ratio of the solid, particulate silicate or aluminosilicate material to the polyvinyl alcohol/aldehyde product should be at least about 0.75:1 with from about 0.75:1 to 3:1 being preferred and from about 1:1 to 3:1 being more preferred. The particular concentration will depend on the specific nature of the solid, particulate material as well as on the nature and concentration of other materials contained in the aqueous system.

The above-described composition has been unexpectedly found to exhibit a high degree of fluid loss control. That is to say that the composition is capable of interacting with the adjacent porosity to inhibit loss of the fluid to the porous environment. The fluid loss of the system can be determined in accordance with the American Petroleum Institute's procedure API No RP-13B for both ambient and high temperature conditions. After initial spurt, the desired water loss control attained with the subject composition is of less than about 20 ml per 30 minutes and, preferably, less than about 15 ml/30 min.

It has been further unexpectedly found that the subject composition has excellent stability to temperature, calcium and sodium salts and various other conditions desired of a fluid used in rotary drilling of bore holes and the like. The drilling fluids containing the subject composition have unexpectedly been found to have high degrees of stability under various adverse conditions. Such fluids have been found to be stable after subjection to elevated temperatures for sustained periods of time, to high shear rates such as are encountered at the site of the drill bit, as well as being stable in the presence of various corrosive elements such as calcium chloride, and sodium chloride which may be entrained in such fluids.

The drilling fluid composition of the subject invention can contain other conventional drilling fluid additives such as weighting agents as, for example, crushed oyster shells, barite and the like; thinner such as ferrochrome lignosulfonate and the like; lost-circulation agents such as ground walnut shells, cotton seed hulls and the like; pH adjusters such as MgO, sodium carbonate, sodium bicarbonate and the like; as well as other conventional additives.

The term "water-based" which is used herein in describing the present invention, generally includes drilling fluids which have a liquid base comprising substantially fresh water or salt water. However, it is to be realized that at times certain small amounts of other liquids may be emulsified or admixed with the water-based fluid. For example, drilling fluids may, at times, contain small amounts of oil, emulsified or admixed with the drilling fluid, the oil coming either from an oil formation drilled into or, under certain conditions, can be purposely added.

The present water-based, drilling fluids containing the subject composition described above and having a pH within the range of from at least about 8 to 12.0, have been found to be stable to temperature, the presence of various salts and to the presence of conventional drilling fluid additives. Other water loss controllers need not be present. Further, the present drilling fluids are substantially non-corrosive and non-destructive to metal equipment commonly used in drilling operations.

The subject composition can be used with conventional bore hole drilling equipment in manners known to those skilled in the art to efficiently and effectively drill bore holes into subterranean formations. The water loss control properties of drilling fluids containing said composition permit more efficient drilling of the bore hole when circulating the fluid while drilling.

The following examples are given for illustrative purposes only, and are not meant to be a limitation on the subject invention except as indicated by the appended claims. All parts and percentages are by weight unless otherwise indicated.

EXAMPLE I

Formation of Polyvinyl Alcohol/Aldehyde (PVA/A) Products

A. 5.625 parts of a commercially obtained polyvinyl alcohol having a weight average molecular weight of 125,000 and 87% hydrolyzed (Gelvatol 20-90) was dissolved in 94.375 parts water. The pH of the solution was adjusted to 5.0 with dilute hydrochloric acid. 1.013 parts of paraformaldehyde (50 percent of stoichiometry) was added to the solution which was then heated to 60° C. with stirring and maintained at that temperature for 30 minutes. The solution was allowed to cool, and had its pH adjusted to 9.5 with a 50% sodium hydroxide solution.

B. A second polyvinyl alcohol/aldehyde product was formed by initially dissolving 11.25 parts of the commercial polyvinyl alcohol described above in 88.75 parts of water and then adjusting the pH of the solution to 3.0 with dilute HCl. 3.83 parts paraformaldehyde (100% stoichiometry) was added and the mixture was stirred and heated to 85° C. and maintained at this temperature for 60 minutes. After cooling, the solution was diluted with an equal part of water and the pH of the solution was adjusted to 9.5 with a 50% sodium hydroxide solution.

EXAMPLE II

An aqueous slurry of commercially obtained sodium bentonite (Wyoming bentonite) was prepared by mixing 6 parts of commercially obtained bentonite with 94 parts of water overnight. 41.7 parts of the formed slurry was diluted with 58.3 parts of water. Four parts of this resultant bentonite slurry was mixed with 1 part of the polyvinyl alcohol/aldehyde product described in Example I(A) to give an aqueous composition containing 2 percent bentonite and 1.3 percent polyvinyl alcohol/aldehyde. The fluid loss characteristics of the formed aqueous system were determined according to API procedure RP 13B at ambient temperature and 100 psi pressure. Total fluid loss was 9.4 ml/30 min; spurt was 1.8 ml and corrected fluid loss was 7.6 ml/30 min. These results are given in Table I below and compared to control samples of each component separately.

For comparative purposes, control samples were prepared from the original aqueous slurry of bentonite and from the polyvinyl alcohol product of Example I(A) to determine fluid loss properties of each. Further, a sample of polyvinyl alcohol/aldehyde product containing 2.85 percent Glen Rose Shale to provide non-silicate solids was also tested. The tests were performed according to API procedure RP 13B and the results are given in Table I below.

TABLE I

| SAMPLE | BENTONITE (%) | PVA/ALD (%) | GRS (%) | TFL | SP | CFL |
|---|---|---|---|---|---|---|
| I | 2 | 1.3 | — | 9.4 | 1.8 | 7.6 |
| II | 2 | — | — | 22.5 | 1.7 | 20.8 |
| III | — | 1.5 | — | >200 | | >200 |

TABLE I-continued

| SAMPLE | BENTO-NITE (%) | PVA/ALD (%) | GRS (%) | TFL | SP | CFL |
|---|---|---|---|---|---|---|
| IV | — | 1.5 | 2.8 | >100 | | >100 |

The above data illustrates the substantially superior fluid loss inhibiting properties attained when using the combination of bentonite and PVA/aldehyde.

EXAMPLE III

The procedure of Example II above was repeated except that the polyvinyl alcohol/aldehyde product used was that of Example I(B). The samples were tested for high temperature-high pressure water loss control according to API procedure RP 13B at 163° C./500 psi pressure differential. The data in Table II below shows that substantially superior results are obtained from samples having the combination of components than from samples of each component separately.

TABLE II

| SAMPLE[a] | BENTO-NITE (%) | PVA/ALD (%) | TFL | SP | CFL |
|---|---|---|---|---|---|
| 1 | 2.85 | 1.5 | 19.6 | 2.6 | 17.0 |
| 2 | 2.85 | — | 45.6 | 2.0 | 43.6 |
| 3 | — | 1.5 | >200 | | >200 |

[a] each sample contained a small amount of ferrochrome lignosulfonate as a dispersant

EXAMPLE IV

The procedure of Example II was repeated except that calcium bentonite was used instead of sodium bentonite. Calcium bentonite was prepared by adding 0.3 part calcium chloride to a 6 percent aqueous dispersion of commercial sodium bentonite to cause exchange of cations. The results are as shown in Table III below.

TABLE III

| SAMPLE | BENTO-NITE (%) | PVA/ALD (%) | TFL | SP | CFL |
|---|---|---|---|---|---|
| 1 | 4.8 | 1.6 | 8.0 | 0.6 | 7.4 |
| 2 | 4.8 | — | 62.0 | — | 62.0 |
| 3 | — | 1.5 | >200 | | >200 |

EXAMPLE V

A polyvinyl alcohol/aldehyde product was formed by initially dissolving 50 parts of 87 percent hydrolyzed polyvinyl alcohol as used in Example I in 150 parts an aqueous solution which contained 16 percent sodium sulfate salt. The pH of the solution was adjusted to 3.0 with 10 percent sulfuric acid solution. 17 parts of paraformaldehyde were then added. The mixture was heated to 60° C. and maintained at this temperature for 30 minutes. The pH was then adjusted to 7–8 with 50 percent solution of NaOH. The precipitate product was filtered, washed and dried at 50° C. for 16 hours under vacuum.

A 5 percent attapulgite clay slurry was prepared by mixing for 10 minutes, a mixture of water and clay which when passed through a stack of sieves gave the following particle distribution: 1.3% on 20 mesh; 5.7% on 40 mesh; 13.3% on 60 mesh; 21% on 100 mesh; 23.5 on 140 mesh; 9.5% on 200 mesh; and 25.5% as fines.

8 Parts of the above polyvinyl alcohol/paraformaldehyde product was dispersed in 92 parts water. One part of the polymer dispersion was mixed with 4 parts of the clay dispersion. The fluid loss of the resultant composition (Sample 2) was determined in the same manner as described in Example II above. In addition, a sample (Sample 1) of clay dispersion diluted 4:1 with water was tested for comparative purposes.

The clay-polymer aqueous composition was then subjected to elevated temperature of 120° C. for 16 hours with agitation and under a nitrogen atmosphere. The sample, (Sample 3) was cooled to ambient temperature and retested. An additional sample, (Sample 4) was heated, as above and then subjected to high shear rates by circulating the sample through a capillary tube (I.D.=0.0314 inch) for 30 minutes to give an approximate calculated shear rate of 25,000 sec$^{-1}$. The fluid loss control of these samples were also determined. The results are given in Table IV below.

TABLE IV

| SAMPLE | ATTA-PUL-GITE (%) | PVA/ALD (%) | TFL | SP | CFL |
|---|---|---|---|---|---|
| 1* | 4.0 | — | >100 | — | >100 |
| 2 | 4.0 | 1.6 | 5.7 | — | 5.7 |
| 3 | 4.0 | 1.6 | 12.5 | 2.6 | 9.9 |
| 4 | 4.0 | 1.6 | 5.2 | — | 5.2 |

*For Comparative Purpose

EXAMPLE VI

The materials, processes and procedures of Example V above were repeated except that the initially formed 5 percent attapulgite slurry was substituted by a 3.8 percent slurry of sepiolite. The sepiolite slurry was formed by mixing 3.8 parts of sepiolite having a particle size distribution of: 1% on 20 mesh; 5.8% on 40 mesh; 14.7% on 60 mesh; 22.1% on 100 mesh; 18.3% on 140 mesh; 12.5 on 200 mesh and 25.3% as fines with 96.2 parts artificially formed sea water according to the formulation disclosed by Brujeweicz in *The Oceans* by H. U. Sverdrup et al., Prentice Hall, 1961, page 186. The sea water contained 106 parts NaCl; 20.9 parts $MgCl_2 6H_2O$; 13.2 parts $MgSO_4$; 6.1 parts $CaCl_2 2H_2O$; 2.9 parts KCl; 0.8 parts $NaHCO_3$; and 0.3 part NaBr with sufficient $H_2O$ to make a 4000 parts sample of sea water.

The samples were formed and tested in the same manner as described in Example V above. Sample 1 is a comparative sample using sepiolite alone. Sample 2 was sepiolite-polymer composition of the subject invention. Sample 3 was the same as Sample 2 except subjected to elevated temperature and agitation for extended period. Sample 4 was the same as Sample 3 except it was further subjected to high shear rates of 25,000 sec$^{-1}$ for 30 min. The results are given in Table V below.

TABLE V

| SAMPLE | SEPIOLITE (%) | PVA/ALD (%) | TFL | SP | CFL |
|---|---|---|---|---|---|
| 1 | 3.0 | — | >100 | — | >100 |
| 2 | 3.0 | 1.6 | 7.4 | — | 7.4 |
| 3 | 3.0 | 1.6 | 8.3 | — | 8.3 |
| 4 | 3.0 | 1.6 | 5.0 | — | 5.0 |

While the invention has been described in connection with certain preferred embodiments, it is not intended to limit the invention to the particular forms set forth, but, on the contrary, it is intended to cover such alternatives, modifications and equivalents as defined by the appended claims.

What is claimed is:

1. A composition capable of imparting fluid loss control to aqueous systems comprising a mixture of solid particulate materials of:
   (a) a substantially water insoluble, solid, particulate silicate or alumino-silicate material which contains a major amount of kaolinite, halloysite, montmorillonite or illite or mixtures thereof, or attapulgite or sepiolite and being of a particle size such that at least about 90 percent by weight is capable of passing through a No. 20 U.S. Standard Sieve, in combination with
   (b) a reaction product formed in an aqueous acidic medium having a pH of about 5.5 or lower between polyvinyl alcohol having an weight average molecular weight of at least 20,000 with at least about 1 to 200 percent of stoichiometry of a compound containing at least one aldehyde group therein or capable of generating in an aqueous medium at least one aldehyde group;
wherein the amount of component (a) to component (b) is in the ratio of from about 0.75:1 to 3:1.

2. The composition of claim 1, wherein the component (a) is a solid, particulate material selected from attapulgite, sepiolite, bentonite or kaolinite.

3. The composition of claim 1, wherein the polyvinyl alcohol has a weight average molecular weight of from about 90,000 to 200,000 and is at least about 75 percent hydrolyzed.

4. The composition of claim 1, wherein the component (a) is a bentonite clay having exchange cations primarily of sodium.

5. The composition of claim 1, wherein the component (a) is a bentonite clay having exchange cations primarily of calcium.

6. The composition of claim 1, wherein the component (a) is an attapulgite material.

7. The composition of claim 1, wherein the component (a) is a sepiolite material.

8. The composition of claim 1, wherein the polyvinyl alcohol is from about 80 to 95 percent hydrolyzed.

9. The composition of claim 1, wherein the aldehyde agent is selected from the group consisting of paraformaldehyde and formaldehyde.

10. The composition of claim 1, wherein the aldehyde agent is selected from the group consisting of a tri($C_1$–$C_3$ alkoxymethyl) melamine and hexa($C_1$–$C_3$ alkoxymethyl) melamine.

11. The composition of claim 1, 2, 3, 4, 5, 6, 7, or 8 wherein component (b) is a reaction product formed in an aqueous acidic medium having a pH of less than about 5.5 between polyvinyl alcohol having a weight average molecular weight of at least 20,000 and is at least about 75 percent hydrolyzed with from about 1 to 200 percent of stoichiometry of a compound containing at least one aldehyde group therein or capable of generating in situ at least one aldehyde group, said compound selected from the group consisting of formaldehyde, acetaldehyde, propionaldehyde, glycolaldehyde, glyoxalic acid, glyoxal, paraformaldehyde, tri(methylol) melamine, hexa(methylol) melamine, tri($C_1$–$C_3$ alkoxymethyl) melamine and hexa($C_1$–$C_3$ alkoxymethyl melamine.

12. In a water-based drilling fluid suitable for circulating in a bore hole while drilling the bore hole into subterranean formations which include water, a weighting agent and a fluid-loss controller, the improvement comprises that said fluid-loss controller agent is, in combination, the composition of claim 1, 2, 3, 4, 5, 6, 7, 8, 9 or 10 present in said fluid in from about 1 to 15 percent by weight based on the weight of the water present in said fluid and said fluid is maintained at a pH of from about 8 to 12.

13. In a water-based drilling fluid suitable for circulating in a bore hole while drilling the bore hole into subterranean formations which include water, a weighting agent and a fluid-loss controller, the improvement comprises that said fluid-loss controller agent is, in combination, the composition of claim 11 present in said fluid in from about 1 to 15 percent by weight based on the weight of the water present in said fluid, said fluid is maintained at a pH of from about 8 to 12.

14. In a process of drilling a bore hole into a subterranean formation using conventional bore hole drilling equipment, the improvement comprising circulating in the bore hole, while drilling, the drilling fluid of claim 12.

15. In a process of drilling a bore hole into a subterranean formation using conventional bore hole drilling equipment, the improvement comprising circulating in the bore hole, while drilling, the drilling fluid of claim 13.

* * * * *